N. HELLEM.
HAND TRUCK.
APPLICATION FILED NOV. 19, 1920.
1,397,098.
Patented Nov. 15, 1921.
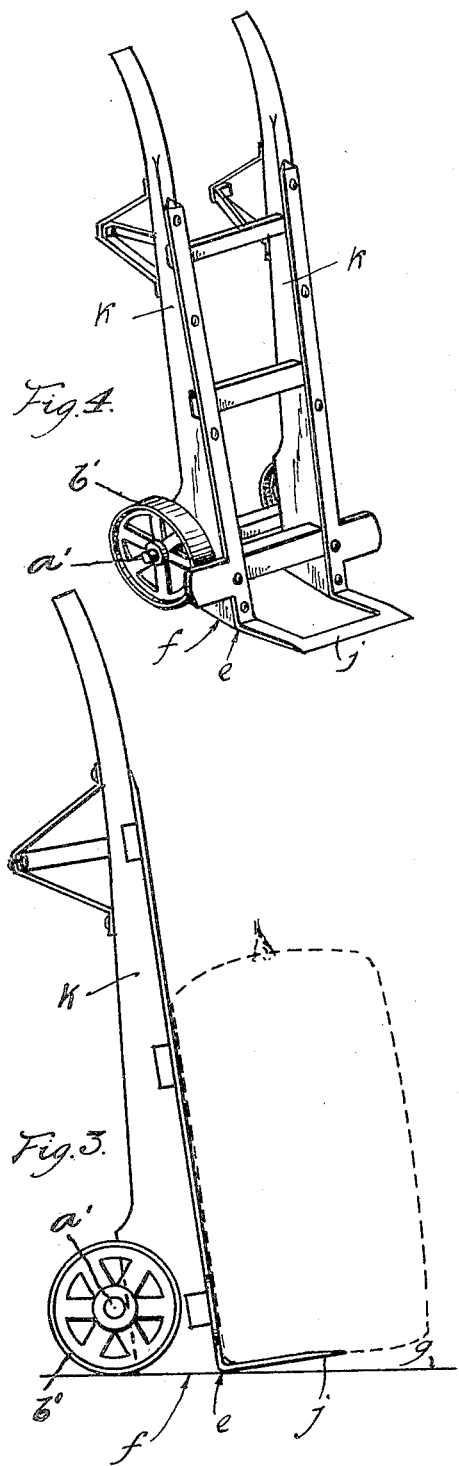
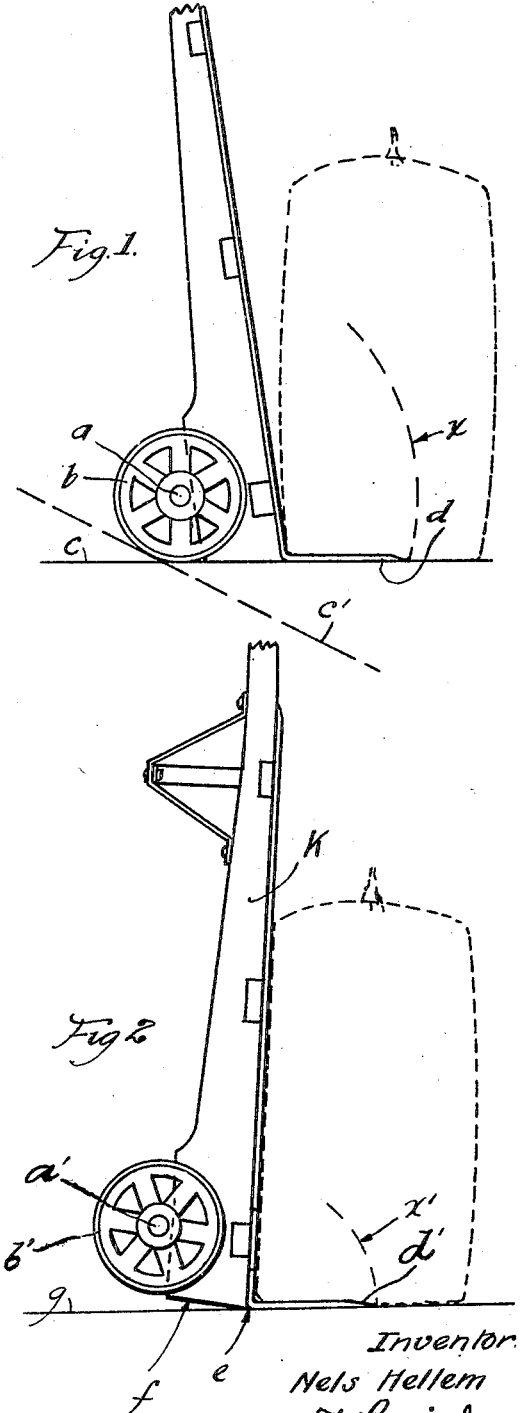
Inventor.
Nels Hellem

UNITED STATES PATENT OFFICE.

NELS HELLEM, OF PORTLAND, OREGON.

HAND-TRUCK.

1,397,098.   Specification of Letters Patent.   Patented Nov. 15, 1921.

Application filed November 19, 1920. Serial No. 425,066.

*To all whom it may concern:*

Be it known that I, NELS HELLEM, a subject of the King of Norway, and a resident of the city of Portland, county of Multnomah, and State of Oregon, have invented a certain new and useful Improvement in Hand-Trucks, of which the following is a specification.

My invention relates to trucks such as used by stevedores or other workmen in warehouses and similar places, for moving loads such, for example, as sacks of flour, or other material, boxes, barrels, and the like.

The object of my invention is to provide a truck which will reduce the amount of physical exertion required of the workman in lifting the load off the floor and throwing it onto the truck.

In order to facilitate my explanation of the purpose of my invention I refer to my accompanying drawing, in which I show a diagrammatic view representing the present type of hand-truck, and the mode of its use, and also showing views illustrating the construction, and mode of work with my truck.

Figure 1 shows a diagrammatic side elevation of the usual type of hand-truck positioned for lifting the load off the floor and also, by imaging a relative movement of the floor line $c$ to $c'$ illustrates the principle of leverage which is brought into action by the workman in tilting the old-type truck so as to pick up the load and throw it onto the truck;

Fig. 2 is a diagrammatic side elevation of my improved hand-truck with its load-carrying cross bar inserted under the load ready for picking up the latter;

Fig. 3 shows the mode in which the principle of leverage is brought into play by my hand-truck in the act of picking up the load and throwing it onto the hand-truck; and Fig. 4 is a perspective view of my improved hand-truck.

Referring again in the first place, to Fig. 1: As well known the hand-truck is a form of lever, and it is apparent that the fulcrum is the axle $a$ of the wheels $b$. The line $c$ represents the floor or other supporting base on which the truck rests; and let the broken line $c'$ represent the relative position of the floor $c$ when the truck has been tilted in the direction indicated by the broken line $x$ in Fig. 1 in the act of picking up the load from the floor and throwing it onto the truck.

Considering, now, on the other hand, the construction of my improved hand-truck, it is to be noted that when my truck is positioned for picking up the load from the floor and throwing it onto the truck the lower end $f$ of the truck frame recedes at an acute angle from the floor line $g$. When now the truck is tilted or pulled over in the direction indicated by the broken line $x'$ in Fig. 2 for the purpose of picking up the load from the floor and throwing it onto the truck the edge $e$ being the vertex of said angle becomes the fulcrum on which the truck is tilted.

The differences to be noted between the construction of my truck and the old type truck, and by which I attain my new results, are these:

The axle $a'$ of the wheels $b'$ is so located that the rims of the latter touch the plane of the lower end $f$ of the truck frame.

Thus, the plane in which said cross-bar is extended and the adjacent plane which the rims of the truck wheels touch, are arranged at an obtuse angle with each other, with the vertex of said angle located relatively close, that is, as close as practical to the tip of the cross-bar, in order that the truck may be fulcrumed on that portion of the lower end of the truck which is coincident with said vertex, and thus the result in mind may be attained. No portion of said lower end of the truck frame should project beyond the said plane of the wheel rims. Of course, the lower end $f$ of the truck frame need not be extended to the last mentioned plane, since the truck could be fulcrumed on the bend $e$ of the cross-bar; but I prefer the construction shown in the drawings.

The load supporting cross-bar $d'$ of my truck makes an acute angle with the truck-frame $k$ instead of the obtuse angle which the same parts, as arranged in the old type truck, make with each other. My truck frame is thus adapted for being supported on its cross-bar $d'$ when stood on end and tilted forward on the cross-bar, as required for picking up the load, and illustrated in Fig. 2.

Hence, when my truck is so stood on end and tilted forward as shown in Fig. 2 and the upper end of the truck is then pulled toward one as indicated by the broken line $x$ in Fig. 2, my truck fulcrums on the vertex of said angle or edge e which, as apparent, is very much nearer the tip of the cross-bar d' of my truck than is the fulcrum a to the tip of the bar d of the old-type truck shown in Fig. 1.

Hence, there is a great mechanical advantage in favor of my construction which enables the workman to tilt my truck to its position in Fig. 3 with but little effort; thus facilitates the picking up and throwing of the load on the truck. On the other hand, in the old type truck considerable more energy would have to be expended in accomplishing the same amount of work, as apparent by assuming the truck of Fig. 1 to be rotated on its axis a, thus imagining the floor line c to have relatively moved to the broken line c', which motion is incidental to the picking up and throwing of the load on to the truck when operating with the old type truck.

The tip of the load carrying cross-bar (d in Fig. 1, or d' in Fig. 2) is always a factor in the work of picking up the load. Note the differences in the paths of motion of said tips as illustrated by the broken curved lines x and x' described from said fulcrum points a and e of Figs. 1 and 2 respectively; hence another mechanical advantage is thus shown in favor of my truck construction.

Note further that in my truck construction the wheels do not touch the floor g until the truck has been tilted sufficiently to pick up and throw the load on to the truck.

Another advantage in favor of my truck is that the load carrying bar d' may be more readily inserted under the article to be picked up, due to the fact that the lower end face of my truck does not touch the floor. On the other hand, in the old type truck said lower end face and also the wheels bear on the floor, thus imposes considerable friction and interference with the work of manipulating the truck so as to get it under the article to be picked up. In consequence in the picking up of sacks of material it not infrequently happens that the sack is cut by the tip of the bar d; for the workman, in order to gain the advantage of momentum, in forcing the cross-bar of his truck under the article to be picked up frequently runs with the truck toward the latter and with the truck slightly tilted so as to keep the lower end of the truck frame and its cross-bar off the floor; and in so doing it frequently happens that the tip of the cross-bar cuts the sack. On the other hand, in my construction, since the truck rests entirely on the cross-bar d' it is only necessary to wiggle my truck a bit in order to insert the cross-bar d' under the load to be picked up. And I have found in practice that such mode of operation effectually avoids any cutting of the sacks containing the load.

Furthermore, there is a decided advantage gained by having the fulcrum point e bear on a fixed support (the floor g) instead of removable support as is provided by the wheels b, for the axle in the old type of hand-truck.

It is further to be noted from a comparison of Figs. 1 and 2 that my truck may be easily disengaged from the load after the latter has been carried to its place, while in the use of the old type truck; its load must be lifted a trifle in order to be able to wiggle the cross-bar d from under it.

Furthermore it is difficult to make a short turn with the old type truck because the lower end of the truck frame and the wheels interfere therewith, but with my truck by lifting the load slightly from the floor and yet not so as to bring the wheels in touch with the latter, a very short turn about a point may be made.

I claim:

1. In a hand truck, a frame provided at its lower end with a load carrying cross-bar, the plane in which said cross-bar projects, and the adjacent plane which the rims of the truck wheels touch being arranged at an obtuse angle with each other, whereby the truck may be tilted forward and fulcrumed on that portion of its lower end which is coincident with the vertex of said angle, for the purpose described.

2. In a hand truck, a frame provided at its lower end with a load carrying cross-bar, the plane in which lie the lower end of the truck frame and the rims of the truck wheels being arranged to make an obtuse angle with the plane in which said cross-bar projects, whereby the truck may be tilted forward and fulcrumed on that portion of its lower end which is coincident with the vertex of said angle, for the purpose described.

NELS HELLEM.